United States Patent

[11] 3,625,796

| [72] | Inventor | George H. Graves<br>Anderson, Ind. |
|---|---|---|
| [21] | Appl. No. | 858,046 |
| [22] | Filed | Sept. 15, 1969 |
| [45] | Patented | Dec. 7, 1971 |
| [73] | Assignee | General Motors Corporation<br>Detroit, Mich. |

[54] METHOD OF MAKING A MOTOR VEHICLE LAMP ASSEMBLY
3 Claims, 5 Drawing Figs.

[52] U.S. Cl. ............................................ 156/293,
240/7.1, 313/113
[51] Int. Cl. ........................................... B29c 19/00
[50] Field of Search ........................... 240/7.1, 7.1
F, 41 SC, 41 B, 41.3, 41.55, 151; 313/113, 116,
117; 156/293, 331

[56] References Cited
UNITED STATES PATENTS

| 2,464,990 | 3/1949 | Plagge | 313/113 |
| 2,750,491 | 6/1956 | Anderson | 240/41 |
| 3,010,045 | 11/1961 | Plagge et al. | 313/113 |
| 3,397,307 | 8/1968 | Cibie | 240/41.55 |

FOREIGN PATENTS

| 224,470 | 11/1962 | Germany | 240/7.1 |

*Primary Examiner*—Louis J. Capozi
*Attorneys*—J. L. Carpenter and E. J. Biskup

ABSTRACT: A motor vehicle lamp assembly includes a plastic lens having a rearwardly extending peripheral lip which is received within a forwardly opening channel formed in a lamp housing. The channel is filled with an initially liquified thermoplastic resin which solidifies upon cooling to establish a strain-free, watertight joint between the lens and the lamp housing.

PATENTED DEC 7 1971 3,625,796

INVENTOR.
George H. Graves
BY
E.J. Biskup
ATTORNEY

METHOD OF MAKING A MOTOR VEHICLE LAMP ASSEMBLY

The present invention relates to motor vehicle lamps, exclusive of headlamps, of the type used for signaling, warning, and clearance purposes. In particular, the present invention provides a lamp assembly and method of manufacture therefor that is especially suited for parking, tail, license, turn signal, side marker, and cornering lamps.

Heretofore, the typical motor vehicle lamp has been assembled prior to mounting on the vehicle by placing a flexible gasket between the lamp housing and the lens and clamping these parts together with screws or other similar mechanical fasteners. Alternatively, the gasket, generally formed of a resilient material such as sponge rubber or vinyl foam, is placed over the joint between the lens-housing joint and compressed to effect a seal in assembly.

From a component standpoint, these assemblies require that the housing and the lens be provided with bosses and cored holes which must be drilled or tapped by additional machining operations. Such bosses and fasteners in addition to increasing the expense of tooling also lead to unlighted areas which detract from the overall illuminated appearance of the lamp.

Insofar as lamp assembly per se is concerned, certain problems are encountered in large volume production. Because of the large forces which must be applied to effect a continuous watertight sealing between the lens and the housing, excessive strains may be created which can cause cracking of the lens. In current lamp assemblies, for example, where more than the minimum gasket compression is used to allow a safety margin and cover various tolerances incident to manufacture and assembly, the gasket if compressed to about 30 percent to 50 percent of initial thickness for applying a required loading of around 8 lbs. per peripheral inch of lens. All the resultant force must the screws or fasteners. As an example, in a 20×3 lamp assembly using six fasteners, if gasket pressure of 8 lbs./inch is required for sealing, the force per screw is likely to be in excess of 60 lbs. A loading of this magnitude oftentimes results in cracking or breakage to the lens due to excessive internal strains. The cracking and breakage problem is further intensified due to warping of the plastic lamp components during manufacturing and storage. Consequently, if the peripheral loading is increased to compensate for warpage, additional internal straining is experienced. On the other hand, if the peripheral loading is maintained at constant value, the gasket may not be compressed sufficiently to seal and establish a continuous watertight joint.

The sealing problem in lamp assemblies of the aforementioned type is further increased because the materials used for gaskets for sealing are not complete barriers against the ingress of water and dirt and tend to acquire a compression set after a period of time. Both of these conditions permit the foreign materials to enter the assembly, contaminate the lens, and impair the optical performance of the lamp. To overcome problems associated with mechanical fastening of the lamp to the housing and, at the same time reduce the ingress of contaminants, some lamps have been assembled using sonic or spin welding techniques. However, the application of these techniques is somewhat limited insofar as parts and materials are concerned. Both methods are limited to relatively small sizes and simple shapes inasmuch as the area and permissible shape of the welded joint is technologically restricted. Additionally, the housing and the lens must be formed of compatible materials to effect a positive weld, a requirement that substantially limits production usage of such assembly.

The present invention, on the other hand, provides an improved unitary motor vehicle lamp assembly which is adaptable to a wide range of shapes and materials, provides a strain-free, watertight seal between the lens and the housing, and eliminates the need for structure and machining operations required by assemblies using mechanical fasteners. More specifically, the lamp assembly includes a plastic lens having a continuous rearwardly extending peripheral lip, and the housing includes a complementary forwardly opening channel. The housing and the lens are initially preheated and a liquified thermoplastic resin is deposited in the channel. The lens is then clamped to the housing with the lip extending into the channel. Upon cooling, the resin solidifies and establishes a strain-free, watertight joint between the lip and the housing. The excess resin displaced by the lip flows inwardly over a relatively shallow interior wall of the channel without detracting from the exterior and lighted appearance of the lamp.

Accordingly, it is an object of the present invention to provide a method of making a motor vehicle lamp assembly which utilizes a thermoplastic resin to establish a sealed joint between a lens member and a housing member thereby eliminating the need for supplemental fasteners and gaskets.

Another object of the present invention is to provide a method of making a lamp assembly for a motor vehicle which is compatible with a wide range of materials of varying shapes and sizes and uses a thermoplastic resin to provide a sealed joint between a lens and a housing.

A further object of the present invention is to provide a unitary motor vehicle lamp assembly wherein a plastic lens has a peripheral lip which is received within a channel formed in a lamp housing, the channel containing an initially liquified thermoplastic resin which solidifies upon cooling to provide a strain-free, watertight joint between the lens and the housing.

A further object of the present invention is to provide an improved method for making a motor vehicle lamp assembly wherein initially preheated lens and housing members are mechanically jointed by a liquified thermoplastic resin which solidifies upon cooling to establish a strain-free, watertight joint between the members.

Figure 1:
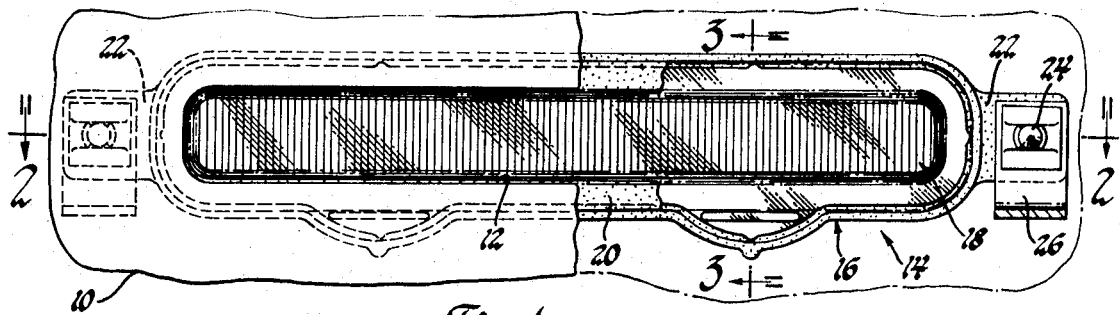
FIG. 1 is an elevational view of a lamp assembly made in accordance with the present invention mounted on a motor vehicle.
Figure 2:
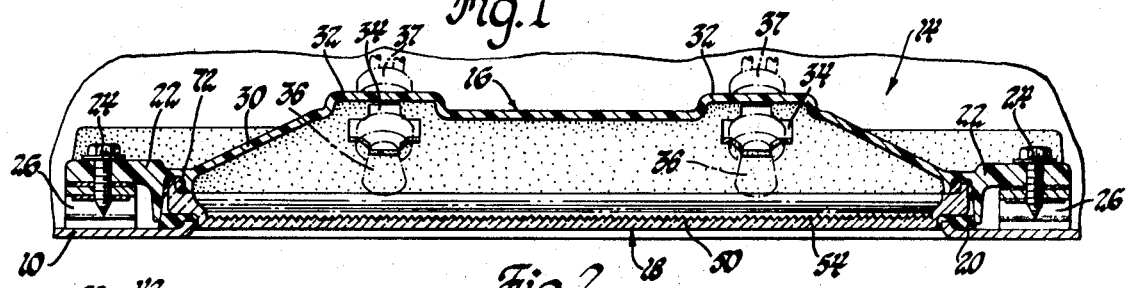
FIG. 2 is a view taken along line 2–2 of FIG. 1.

Referring to FIG. 1, there is shown a rear body panel 10 for a motor vehicle that has a generally rectangular opening 12 in which a backup lamp assembly 14 made in accordance with the present invention is fixedly mounted. As is conventional, the lamp assembly 14 provides rearward illumination whenever the vehicle is conditional for reverse motion. However, it will hereinafter become apparent that the present invention is equally adaptable for all motor vehicle lighting, such as parking, tail, license, turn signal, side marker, and cornering lamps.

The lamp assembly 14 generally comprises a housing 16, a lens 18, and a mounting gasket 20. The housing 16 includes a pair of laterally extending mounting lugs 22 which are mechanically secured by fasteners 24 to brackets 26 affixed to an interior surface of the panel 10. The housing 16 is formed from a plastic material although a wide variety of other materials such as zinc, aluminum, or plated die castings, and metallic stampings are equally adapted to the invention. The housing 16 includes a dish-shaped reflector 30 having a pair of inclined lamp mounting sections 32. Each mounting section 32 includes an irregularly shaped lamp opening 34 for positioning and mounting a lamp bulb 36 and an associated socket 37. The lamp bulb 36 and the socket 37 form no part of the present invention and reference can be made to U.S. Pat. No. 3,559,152, entitled Lamp Socket and Panel Assembly, filed June 7, 1968 in the name of Warren Pearce, Jr. and assigned to the assignee of the present invention, for the details of construction.

A forwardly opening channel 40, generally U-shaped in cross section, is formed in the frontal surface of the housing 16. The channel 40 extends about the periphery of the reflector 30 and is defined by a forwardly projecting marginal shoulder or outer wall 42, a continuous inwardly spaced rim or inner wall 44 of lesser height than the shoulder 42, and a base 46.

Figure 3:
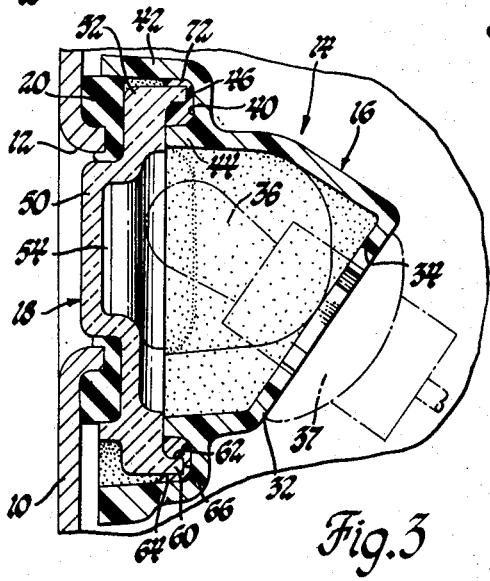
FIG. 3 is an enlarged view taken along line 3–3 of FIG. 1.

The lens 18 is formed of a transparent plastic material such as crystal methyl methacrylate and includes a central rectangularly shaped optical section 50 circumscribed by a marginal flange 52. Referring to FIG. 3, the optical section 50 projects through the opening 12 in the panel 10. The gasket 20 formed of a resilient material such as vinyl foam is disposed outwardly of the optical section 50 on the flange 52 and functions to provide a resilient mounting between the panel 10 and the lens 18. The interior surface of the optical section 50 includes a plurality of vertical refracting flutes or prisms 54 for selectively distributing illumination from the light bulb 36 into a predetermined area rearwardly of the vehicle. The flange 52 of the lens 18 includes a rearwardly projecting peripheral lip 60 which is defined by an inner wall 62, an outer wall 64, and a base wall 66.

Figure 4:
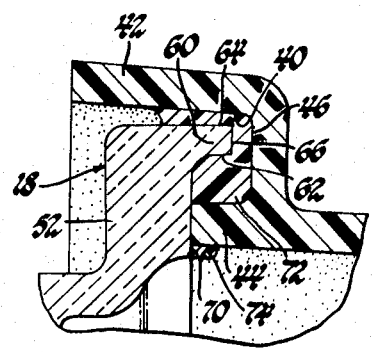
FIG. 4 is an enlarged view of the joint between the lens and the housing.

Referring to FIG. 4, the rear surface 70 of the flange 52 engages the top surface of the rim 44. In this position, the lip 60 extends into the channel 40 with the walls 62, from the shoulder 42, base 46, and rim 44. The lens 18 and the housing 16 are mechanically and sealingly secured together by a solidified thermoplastic resin 72 which adheres to the lip 60 and the channel 40.

More specifically, the thermoplastic resin used herein can be broadly characterized as a hot melt adhesive of the polyamide resin type which, in its original state, is a solid and is liquified by heat prior to deposition into the channel 40. The thermoplastic resin should melt at a temperature less than the melting temperatures of the lens and housing materials, and should possess resistance to humidity, water immersion, ultraviolet light exposure, salt exposure, temperature cycling, and outdoor weather exposure. One polyamide resin found to possess the above-mentioned physical characteristics and used successfully to effect the bonded assembly is commercially available as "HM–508R" made by the H. B. Fuller Company of St. Paul, Minn.

Figure 5:
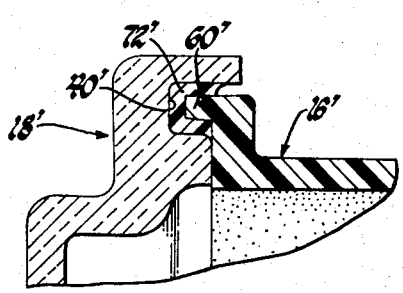
FIG. 5 is a view similar to FIG. 4 showing a modified construction.

FIG. 5 illustrates a modified construction which is particularly well adapted for direct mounting against an exterior surface vehicle wherein the lamp lens 18' is provided with a rearwardly opening U-shaped channel 40'. The housing 16' is provided with a forwardly projecting peripheral lip 60' which is received within the channel 40'. As described with reference to FIGS. 1–4, the initially liquified thermoplastic resin 72' solidifies to establish a strain-free, watertight seal between the lip 60' and the channel 40'.

Lamp assemblies of the above-described constructions have been successfully tested and found to provide strain-free, watertight joints when the following representative parameters are incorporated into the design having a lip width of .075 inch wide:

| Length of the Channel 40(in.) | Height of the Shoulder 42 (in.) to | Height of the Channel 40(in.) | Width of the Channel 40(in.) |
| --- | --- | --- | --- |
| 0 10 | 0.12 | 0.18 | 0.150 |
| 10 to 15 | 0.21 | 0.20 | 0.200 |
| 15 to 20 | 0.38 | 0.25 | 0.250 |

By varying the above dimensions in accordance with the channel length, the lamp assembly will be continuously peripherally sealed despite production dimensional variances including warpage in the lens 18 and the housing 16. Also, these relative sizes ensure sufficient channel volume to provide progressive cooling of the resin and complete adhesion to the surfaces of the channel 40 and the lip 60.

To assemble the lamp assembly 14, the housing 16 and the lens 18 are preheated to the temperature of around 150° F. Experience has shown that the preheating is necessary to ensure that the thermoplastic resin will "wet" or adhere to the walls 62, 64, and 66 of the lip and about the U-shaped channel 40 to thereby form an uninterrupted sealed joint. The preheated housing is then positioned on a stationary or moving horizontal surface with the channel 40 projecting upwardly in a liquid containing position. By conventional dispensing equipment, the liquified resin is deposited into the channel 40 at an elevated temperature of between 300° F. and 450° F. or other temperatures at which the resin has viscous properties compatible with available dispensing equipment. Before solidification of the resin 72 has commenced, approximately 30 seconds with the above-described resin, the lens 18 is positioned against the housing 16 with the rear surface 70 engaging the top surface of the rim 44 and the lip 60 centered with respect to the channel 40 and projecting downwardly therewithin. Because the rim 44 has a lesser height than the shoulder 42, any excess resin will be displaced inwardly and solidified upon cooling adjacent the inner surface of the rim 44, as representatively illustrated at 74, FIG. 4. The excess material, therefore, does not detract from the exterior appearance of the assembly and, at the same time, does not impair the illuminated appearance of the lamp. After deposition of the liquified resin 72, a slight clamping pressure may be applied to the lens 18 in the housing 16 to prevent any relative movement therebetween. The clamping pressure, however, should be kept at a relatively low level to avoid stressing components and thereby allowing the resin to effect a strain-free and watertight seal between mating parts. The assembly thus formed is allowed to slowly air-cool although a forced circulation of air over the sealed joint can also be effectively utilized.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A method of joining a lens member to a housing member to form a motor vehicle lamp assembly comprising the steps of: forming a liquid containable depression in one of the members; forming a projecting surface on the other member complemental to said depression and adapted to extend a predetermined distance therewith; preheating the members sufficiently to cause a thermoplastic resin to adhere to said projecting surface and said channel; depositing a liquified thermoplastic resin into the channel at an elevated temperature; positioning said lip said predetermined distance into said channel with the latter in a liquid containing position; and cooling said members to solidify said resin and effect a strain-free, watertight seal therebetween.

2. A method of peripherally joining and sealing a plastic lens member to a housing member to form a motor vehicle lamp assembly comprising the steps of: forming a liquid containable channel in one of the members and a complemental projecting lip in the other of the members; preheating the members above 150° F. to an elevated temperature at which a liquified thermoplastic resin will adhere to the surfaces of said channel and said lip; pouring a liquified polyamide thermoplastic resin into said channel at an elevated temperature in excess of 300° F. such that said resin remains liquified for a predetermined time after pouring; placing said lip within said channel and into said liquified resin within said predetermined time; positioning said lip with respect to said channel so that said liquified resin continuously wets the inner and outer surfaces of said lip; and slowly cooling the members to gradually and progressively establish a strain-free, watertight seal therebetween.

3. A method of peripherally joining and sealing a plastic lens member to a housing member to form a strain-free motor vehicle lamp assembly comprising the steps of: forming a liquid containable channel in one of the members; forming a projecting lip in the other of the members complemental to the channel but having a lesser width than said channel; preheating the members above 150° F. to an elevated temperature at which a liquified polyamide thermoplastic resin will adhere to the surfaces of said channel and said lip; pouring a liquified polyamide thermoplastic resin into said channel at an elevated temperature above 300° F. such that said resin remains liquified for a predetermined time after pouring; placing said lip into said channel and said liquified resin within said predetermined time; positioning said lip in spaced relationship to the surfaces of the channel and in continuous peripheral contact with the resin so that said liquified resin continuously wets the preheated inner and outer surfaces of said lip; applying a clamping pressure to the members sufficient to prevent relative movement therebetween but insufficient to cause stressing thereof; and cooling the members to gradually and progressively establish a strain-free, watertight seal.

* * * * *

PO-1050
(5/69)

UNITED STATES PATENT OFFICE
CERTIFICATE OF CORRECTION

Patent No. 3,625,796     Dated December 7, 1971

Inventor(s) George H. Graves

It is certified that error appears in the above-identified patent and that said Letters Patent are hereby corrected as shown below:

Column 1, line 32, after "gasket" delete "if" and
insert -- is --, line 35, after "must" insert -- be taken
by --; Column 2, line 29, delete "jointed" and insert
-- joined --; Column 3, line 19, after "62," insert
-- 64 and 66 being respectively spaced --, line 53 through
57 of the third column should read Height
          of the
          rim 44
          (in.)

0.18
          0.20
          0.25

Signed and sealed this 27th day of March 1973.

(SEAL)
Attest:

EDWARD M. FLETCHER, JR.            ROBERT GOTTSCHALK
Attesting Officer                  Commissioner of Patents